Figure 1:
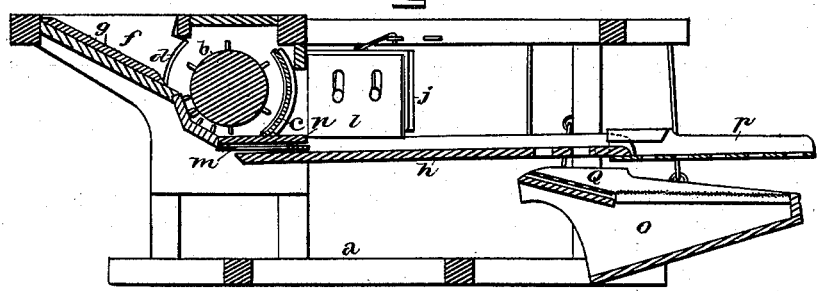
Figure 2:
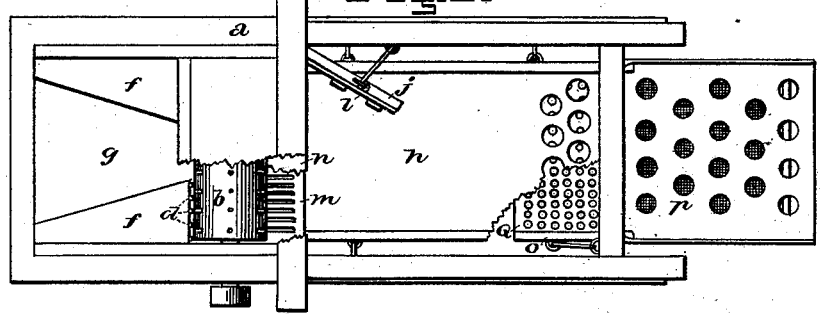
Figure 3:
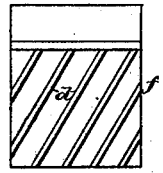
Figure 4:
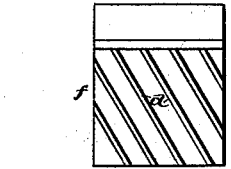
Figure 5:
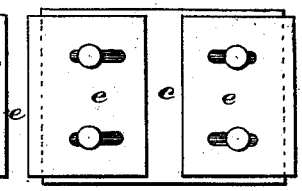
Figure 6:
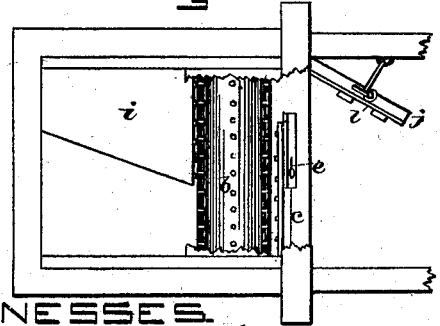
Figure 7:
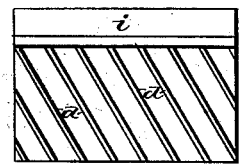
Figure 8:
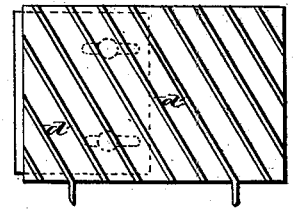

J. BROWN.
Thrashing-Machine.

No. 203,318.  Patented May 7, 1878.

WITNESSES.
Jas. F. DuHamel
J. W. Garner

INVENTOR:
J. Brown,
per
J. W. Lehmann,
Atty.

UNITED STATES PATENT OFFICE.

JONATHAN BROWN, OF ELGIN COUNTY, CANADA, ASSIGNOR TO DANIEL STEWART, OF SAME PLACE.

IMPROVEMENT IN THRASHING-MACHINES.

Specification forming part of Letters Patent No. 203,318, dated May 7, 1878; application filed March 30, 1878.

*To all whom it may concern:*

Be it known that I, JONATHAN BROWN, of the county of Elgin and Dominion of Canada, have invented certain new and useful Improvements in Thrashing-Machines; and I do hereby declare the following to be a full, clear, and exact description of the invention, such as will enable others skilled in the art to which it pertains to make and use it, reference being had to the accompanying drawings, which form part of this specification.

My invention relates to an improvement in thrashing-machines; and it consists in the arrangement and combination of parts that will be more fully described hereinafter.

The accompanying drawings represent my invention.

$a$ represents a frame of any suitable description, in one end of which is journaled the thrashing-cylinder $b$, which may be of any construction preferred. Closing the back of the frame or box in which the cylinder works is the concave $c$, made of iron, wood, or other material, and having a number of ribs or conveyers, $d$, formed upon its inner surface. These ribs incline toward each end from the center, so that as the cylinder revolves the seed will be forced around toward each end.

In order to make the distance the seed shall travel longer or shorter, as it may be desired to thrash them more or less, a slide, $e$, is attached to each end on the back of the concave, which slides may be drawn out to any desired distance beyond the end of the concave, so as to decrease the size of the openings through which the seed is discharged, and increase the distance the seed must travel.

In the mouth of the machine are placed the two blocks $f$, having their inner sides tapered, as shown, so as to guide the seed directly to the center of the cylinder, and which blocks are held in their proper positions by means of the board $g$, which is placed between them. The inner ends of both of these blocks are also provided with ribs or conveyers $d$, so constructed as to convey the seed toward each end of the cylinder. By thus using spiral flanges upon the concave and the blocks and teeth upon the cylinder, fully one-half more speed is gained than when teeth only are used, as the ribs act on the principle of the screw, and thus carry the seed around more rapidly.

As the seeds issue from both ends of the thrashing frame or box they pass out upon the shaker $h$, and distribute themselves evenly over the surface. Where but a single block, $i$, is used, and the feed is all on one side, the seed is made to traverse the whole length of the cylinder, and issues upon the shaker $h$ at one end only.

In order to distribute the seed evenly over the shaker in this instance, the hinged door $j$ is used, against which the seed strikes, and then rebounds across the shaker. Upon the inside of this door, which can be swung back out of the way when not needed, is the slide L, which can be moved downward so that its bottom edge will almost touch the shaker or apron.

In the bottom of the frame, under the cylinder, is placed a suitable grating, $m$, through which, when the machine is used for thrashing grain, the grain passes into a receptacle below.

When the machine is to be used for thrashing clover or other seed, the cover $n$ is passed over the grating, so as to cover it completely, and thus cause the seed to move toward one or both ends of the cylinder.

The outer end of the shaker is perforated, as shown, and under this end is placed a shoe, $o$. When there is straw mixed with the seed, and it becomes necessary to separate them, a movable extension-bolt, $p$, is slipped over the end of the shaker, which, being perforated, allows the seed to pass through, while the straw passes over the end.

In the front end of the shoe, under the perforations in the end of the shaker, is secured the perforated board or plate Q, upon which the seed fall, and which board or plate conveys them upon the upper end of the sieve. Through this plate and sieve the seed fall upon the inclined surface below and run off.

Having thus described my invention, I claim—

1. The combination of the cylinder $b$, concave $c$, and the two blocks $f$, the concave and blocks being provided with the oppositely-inclined spiral ribs $d$, whereby the seed are discharged at both ends of the cylinder, substantially as shown.

2. In a clover-huller, the combination of the shaker $h$, the door $j$, having the adjustable slide $l$, and the thrashing-cylinder, the door being adapted to be adjusted back and forth over the riddle, substantially as shown.

3. The grating $m$ under the cylinder $b$, provided with the removable cover $n$, substantially as specified.

In testimony that I claim the foregoing I have hereunto set my hand this 27th day of March, 1878.

JONATHAN BROWN.

Witnesses:
   F. A. LEHMANN,
   W. H. KERN.